H. GROHMANN.
PROCESS OF PRODUCING ENDOTHERMIC GAS REACTIONS AND APPARATUS THEREFOR.
APPLICATION FILED AUG. 19, 1911.
1,035,873.
Patented Aug. 20, 1912.
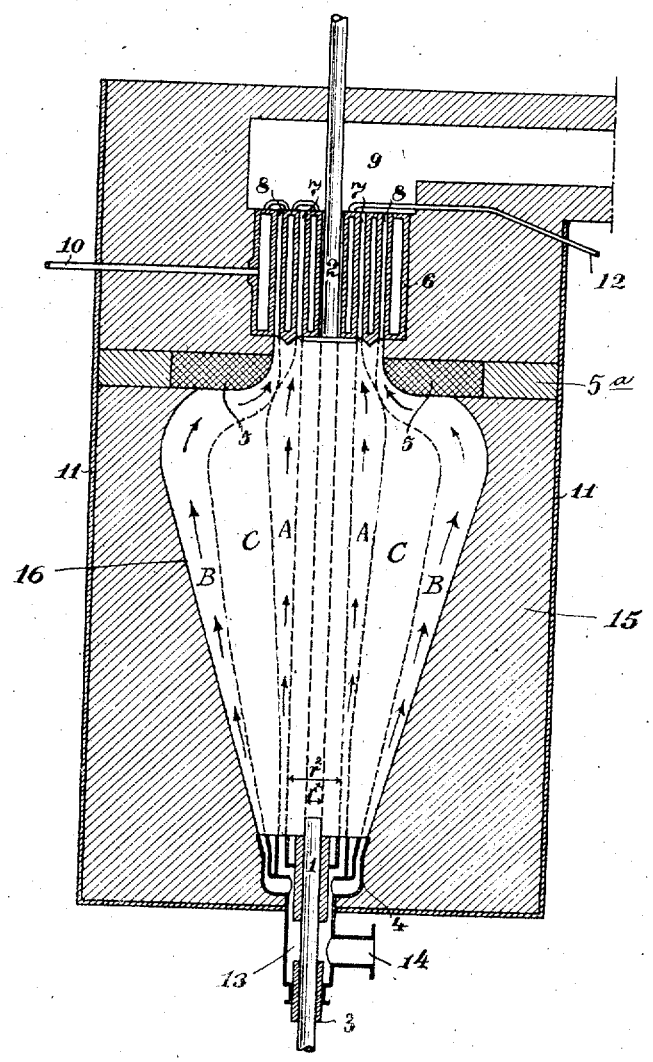
Inventor.
Hans Grohmann
by Massie & McElroy
Attorneys.

UNITED STATES PATENT OFFICE.

HANS GROHMANN, OF COLOGNE, GERMANY, ASSIGNOR TO THE FIRM OF SALPETER-SÄURE-INDUSTRIE-GESELLSCHAFT, G. M. B. H., OF COLOGNE, GERMANY.

PROCESS OF PRODUCING ENDOTHERMIC GAS REACTIONS AND APPARATUS THEREFOR.

1,035,873.  Specification of Letters Patent.  Patented Aug. 20, 1912.

Application filed August 19, 1911. Serial No. 644,929.

*To all whom it may concern:*

Be it known that I, HANS GROHMANN, a subject of the King of Prussia, residing at Cologne-on-the-Rhine, in the Kingdom of Prussia and German Empire, have invented new and useful Improvements in Processes of Producing Endothermic Gas Reactions and Apparatus Therefor, of which the following is a specification.

The formation of nitrogen oxids from air by means of the electric arc is, at the present time, considered to be due to the thermic action of the arc. It is commonly understood that in order to combine atmospheric nitrogen with oxygen, it is necessary to heat the air to a certain temperature, with the greatest care to avoid loss of heat, then to keep said air at this temperature for some time, until the condition of reaction equilibrium is obtained, and finally to cool the hot gases down to about 1500° C. more quickly than the decomposition of nitrogen oxids can take place at the temperature in question. In this way the greatest output is believed to be obtained at the temperature chosen.

This invention relates to processes of producing endothermic gas reactions and apparatus therefor; and it comprises a process wherein a gas or a mixture of gases to be treated is caused to travel as a moving tubular envelop or mantle of relatively small diameter in contact with and laterally inclosing an elongated electric arc sprung between a pair of suitably energized electrodes in a reaction chamber, another gaseous tubular envelop or mantle of greater diameter is caused to travel outside of and substantially coaxially with the first named envelop but spaced away therefrom throughout the major portion of its travel by an intermediate layer of relatively quiet gas, and the gases issuing from the reaction chamber in close proximity to the arc and relatively rich in reaction products are cooled separately from the relatively dilute gases issuing from the chamber at a greater distance from the arc; and it also comprises apparatus suitable for carrying out the said process, said apparatus comprising a shaft furnace, means for maintaining a long stable arc in the furnace shaft, means for conducting a body of gas along and in close proximity to the arc and in the approximate form of a hollow cylindrical mantle or envelop, means for conducting another gaseous envelop outside of the first named envelop and close to the walls of the furnace shaft, and means for separately cooling gases issuing from the furnace in close proximity to the arc and those issuing therefrom at a greater distance from the arc; all as more fully hereinafter set forth and as claimed.

In order to render the nature of the present invention clearly apparent, a specific illustrative embodiment of the process and apparatus as applied to the manufacture of oxids of nitrogen will be hereinafter described, wherein a gas mixture containing nitrogen and oxygen, specifically air, is subjected to the action of an electric arc in such a manner as to effect the desired formation of nitrogen oxids.

Almost all forms of apparatus heretofore proposed only partly comply with these theoretical requirements. In some of the proposed devices, a comparatively small part of the total amount of air conducted to the furnace is heated to a very high temperature by direct contact with the arc, while the subsequent cooling is effected by mixing the hot reaction gases with the cold part of the air first introduced, or with separately introduced cold air. A definite temperature and a perfect utilization of the reaction cannot be obtained under these conditions, because from every flame heretofore used a much higher concentration can be produced by means of cooled capillaries than is obtained technically.

In the apparatus of the present invention the air is heated with the greatest economy possible, while at the same time a very high reacting temperature is used. Furthermore, advantage is taken of the principle that subjecting the hot reaction gases to the influence of cooled metal surfaces not only qualitatively but also quantitatively gives a higher yield of nitrogen oxids than according to the method of cooling heretofore adopted by mixing the hot reaction gases with cold air.

In the drawing illustrating the invention a vertical section of a cylindrical furnace is shown by way of example. The furnace body of fire brick or suitable refractory material 15 incloses a shaft whose walls 16 diverge from below upward, thus giving the shaft a generally conical form. Between the electrodes 1 and 2 a quietly burning vertical arc is formed. The electrode 1 at the inlet end of the shaft is isolated by cylinder 3, of porcelain or the like from the nozzle body 4 having annular openings concentric to the axis of the furnace. Connected to the nozzle body 4 is tube or twyer 13 to which air under pressure is led through 14. The air issuing from the inner nozzle forms substantially a hollow cylinder, and the air from the outer nozzle, a hollow cone. The outer nozzle has substantially the same conicity as the flame shaft, diverging away from the axis of the electrodes, as shown in the drawing. The temperature and volume of the air increase in the direction 1, 2. At the top or outlet end the shaft walls converge or curve inwardly somewhat abruptly, and the conicity of the shaft passes over gradually into annular body 5 of highly refractory material surrounded by an outer ring $5^a$, by which the current of air issuing from the inner nozzle opening and surrounding the arc is contracted. A cooling device 6 located beyond the contracted portion of the furnace shaft has concentric annular slits or passages 7 and 8 through which the gases leave the furnace shaft. The cooling box 6, which is best constructed of metal, is supplied with a suitable cooling medium, such as water, through pipe 10, the cooling medium being led off through outlet pipe 12. In the interior of the shaft is maintained an excess pressure of about 100 mm. of mercury, and accordingly the furnace shaft, which is constructed of bricks, is best surrounded by a sheet metal mantle 11 to prevent escape of gases.

In the shaft there are thus two substantially concentric current zones, mantles, or envelops of gases moving more or less rapidly through the furnace shaft from electrode 1 to electrode 2 in the same general direction. The inner envelop A issues from the inner annular opening of the nozzle body 4 and surrounds and straightens the arc. This straightening tendency of an annular nozzle, having an inner diameter $r^2$ larger than the diameter $r'$ of the electrodes, is so decisive that even in the open air stable arcs of any desired length can be formed. The outer envelop B issues from the outer annular nozzle opening and passes along the shaft walls. The inner current or envelop is separated from the outer one by a gaseous zone C which has comparatively little motion. This intermediate zone protects the gases immediately surrounding the arc from excessive losses of heat, so that the temperature of these gases surrounding the arc can be driven very high and gradually increases from 1 toward 2. The gaseous mantles thus pass through the furnace shaft substantially independently of each other.

The air blown along the wall out of the outer annular nozzle opening serves to absorb the heat radiating from the arc, and, with the assistance of the annular member 5, to contract the mantle of gases immediately surrounding the arc at the top, so that these gases pass out mainly through the annular passage 7, while the outer gaseous current passes mainly through the passage 8. The amount of air issuing from the outer nozzle opening at the lower end of the shaft should be so regulated that the temperature of the outer zone B in the vicinity of the annular body 5 is just below the melting temperature of said body.

The contraction of the top end of the shaft is desirable in order to decrease the loss of heat by radiation in the cooling device, and, further, also for the purpose of causing the change from high temperature to a lower temperature to take place as suddenly as possible. If the contraction were effected with the hot gases immediately surrounding the arc directly in contact with the shaft walls and without conducting a shielding and spacing layer of cooler gases along the wall, the temperature of the air immediately surrounding the arc could not be driven so high, because otherwise the material of the annular body 5 would suffer. The boundaries of the various gaseous zones or envelops are indicated on the drawing by dotted lines. It is to be understood however that such boundaries are not rigidly defined, and that the drawing represents such boundaries only approximately. The diverging character of the major part of the furnace shaft permits the maintenance of these more or less definite gaseous zones or mantles in spite of the increasing volume of the gases in the upper part of the shaft due to the higher temperature there existing.

It is a well known phenomenon that gases having different speeds of motion require considerable time to become mixed. Consequently most of the air led along the wall to protect the annular body 5 and not having a very high temperature really passes through the annular passage 8, while most of the gases traveling close to the arc pass through the annular passage 7. If both bodies of gas were led off through one passage a certain decomposition of the formed nitrogen oxids would occur, owing to the insufficient cooling effected by the intimate mixture of the very hot gases immediately surrounding the arc and those of lower temperatures passing along the wall of the shaft and the consequent partial reversal of the oxid-forming reaction.

In the gases traveling close to the arc there is of course a considerably higher conversion of the original air into nitrogen oxids than occurs in the body of gases passing along the shaft walls. Consequently the gases leaving the furnace shaft through passage 7 are of relatively high concentration as regards their content of nitrogen oxids, while those leaving through passage 8 are relatively dilute. Both the concentrated and the dilute gases are suddenly cooled by the metal surfaces in cooling box 6 to a temperature at which nitrogen oxids are stable. Consequently when the cooled gases mingle in chamber 9 there is substantially no loss of oxids by reversal of the oxid-forming reaction. The gases are led from chamber 9 to any convenient place for suitable treatment.

If it is desired to separately collect the gases of higher concentration from the passage 7 it is only necessary to divide the chamber 9 into two parts, into one of which pass the gases from the passage 7 and into the other part the gases from the passage 8.

What I claim and desire to secure by Letters Patent of the United States is:—

1. A furnace for producing endothermic gas reactions, comprising in combination electrodes for producing an electric arc, an annular air nozzle surrounding, and concentric to one of said electrodes, an annular gas nozzle surrounding said first nozzle and diverging away from the axis of said electrode, a pear-shaped shaft inclosing the space between said electrodes, substantially as, and for the purpose, set forth.

2. A furnace for producing endothermic gas reactions, comprising in combination, electrodes for producing an electric arc, annular gas nozzles surrounding, and directed at different angles in regard to, said electrodes, a pear-shaped shaft inclosing the space between said electrodes, and concentric passages provided at the end of said shaft opposite to that at which the nozzles are provided, substantially as, and for the purpose, set forth.

3. A furnace for producing endothermic gas reactions, comprising in combination, electrodes for producing an electric arc, gas nozzles surrounding, and at different angles to, one of said electrodes, an internally pear shaped shaft inclosing the space between said electrodes, passages concentric to the axis of said electrodes and disposed at the end of said shaft opposite to that at which the nozzles are disposed, and water jackets to cool said passages, substantially as, and for the purpose, set forth.

4. A furnace for producing endothermic gas reactions, comprising a furnace shaft relatively narrow at one end and having walls which diverge gradually toward the opposite end of said shaft and then converge somewhat abruptly near said opposite end, an electrode located at each end of said shaft and substantially axially thereof, means for passing a gas through said shaft close to its axis, and means for passing a gas along the shaft walls.

5. A furnace for producing endothermic gas reactions, comprising a furnace shaft relatively narrow at one end and having walls which diverge gradually toward the opposite end of said shaft and then converge somewhat abruptly near said opposite end, an electrode located at each end of said shaft and substantially axially thereof, means for passing a gas through said shaft close to its axis, means for passing a gas along the shaft walls, and means for separately cooling gases which have passed axially through the shaft and those which have passed through the shaft near its walls.

6. A furnace for producing endothermic gas reactions, comprising a furnace shaft having suitable refractory walls, means for maintaining an arc in said shaft, means for passing a mantle or envelop of gas through said shaft close to the arc, and means for passing another mantle or envelop of gas along the shaft walls independently of the first-named mantle.

7. A furnace for producing endothermic gas reactions, comprising a furnace shaft, means for maintaining an arc substantially axially thereof, and means for passing through said shaft spaced and substantially concentric envelops or mantles of gas surrounding the arc and traveling in the same general direction.

8. The process of producing endothermic gas reactions, which comprises conducting a body of gases to be treated along and in close proximity to an electric arc, such body being substantially in the form of a hollow cylindrical envelop or mantle of traveling gases laterally inclosing said arc, conducting another gaseous mantle in the same general direction but outside of the mantle first named and substantially distinct therefrom, and separately cooling the gases of the said mantles after they have passed beyond the arc.

9. The process of producing endothermic gas reactions, which comprises establishing a long arc in a suitable furnace chamber and conducting through said chamber a plurality of spaced mantles of gases to be treated traveling in the same general direction, said mantles inclosing laterally and being substantially coaxial with said arc, and the innermost of said mantles being in close proximity to said arc.

10. The process of producing oxids of nitrogen, which comprises conducting gases comprising nitrogen in the form of a traveling mantle along the length of and in close proximity to an electric arc, and maintaining another mantle of gases traveling in the same general direction and surrounding but somewhat spaced away from the inner mantle.

11. The process of producing oxids of nitrogen, which comprises conducting gases comprising nitrogen in the form of a traveling mantle along the length of and in close proximity to an electric arc, maintaining another mantle of gases traveling in the same general direction and surrounding but somewhat spaced away from the inner mantle, and separately cooling the gases of the said mantles beyond the arc.

12. The process of producing oxids of nitrogen, which comprises conducting air in the form of an inclosing mantle or envelop along the length of and in close proximity to a long arc, conducting another inclosing envelop of air outside of and spaced away from the inner mantle, and separately cooling the gases of the said mantles beyond the arc to a temperature below that at which substantial decomposition of nitrogen oxid occurs.

In testimony whereof I have signed my name to this specification in the presence of two subscribing witnesses.

HANS GROHMANN.

Witnesses:
RICHARD MERKEL,
OSCAR DEPNER.